(12) United States Patent
Baldinger et al.

(10) Patent No.: US 11,008,702 B2
(45) Date of Patent: May 18, 2021

(54) HIGH-STRENGTH FIBER ROPE FOR LIFTING DEVICES SUCH AS CRANES

(71) Applicant: Teufelberger Fiber Rope GmbH, Wels (AT)

(72) Inventors: Peter Baldinger, Schwertberg (AT); Robert Traxl, Ebensee (AT); Gunther Kaiser, Thalheim/Wels (AT); Rudolf Kirth, Vöcklabruck (AT); Björn Ernst, Gmunden (AT); Erich Rührnössl, Haid (AT)

(73) Assignee: TEUFELBERGER FIBER ROPE GMBH, Wels (AT)

( * ) Notice: Subject to any disclaimer, the term of this patent is extended or adjusted under 35 U.S.C. 154(b) by 64 days.

(21) Appl. No.: 15/769,474

(22) PCT Filed: Oct. 20, 2016

(86) PCT No.: PCT/EP2016/075251
§ 371 (c)(1),
(2) Date: Apr. 19, 2018

(87) PCT Pub. No.: WO2017/068054
PCT Pub. Date: Apr. 27, 2017

(65) Prior Publication Data
US 2018/0305864 A1    Oct. 25, 2018

(30) Foreign Application Priority Data
Oct. 21, 2015   (DE) .............. 10 2015 013 604.6

(51) Int. Cl.
*D07B 1/14* (2006.01)
*B66C 15/00* (2006.01)
(Continued)

(52) U.S. Cl.
CPC ............ *D07B 1/145* (2013.01); *B66B 7/1238* (2013.01); *B66C 15/00* (2013.01); *B66D 1/54* (2013.01);
(Continued)

(58) Field of Classification Search
CPC .................... D07B 1/04; D07B 1/145
See application file for complete search history.

(56) References Cited

U.S. PATENT DOCUMENTS 3,805,667 A * 4/1974 Orser ................ H01B 7/045
87/6
3,949,755 A * 4/1976 Vauquois .............. D06P 1/0004
606/229

(Continued)

FOREIGN PATENT DOCUMENTS

DE    22 22 312 A1    11/1973
DE    24 55 273 B2    5/1976
(Continued)

OTHER PUBLICATIONS

International Search Report dated Jan. 1, 2017, issued in PCT Application No. PCT/EP2016/075251, filed Oct. 20, 2016.
(Continued)

*Primary Examiner* — Shaun R Hurley
(74) *Attorney, Agent, or Firm* — Workman Nydegger

(57) ABSTRACT

The present invention relates to a high-strength fibre rope for hoisting equipment like cranes having a rope core (11) comprising high-strength synthetic fibres or strands (4) as well as a sheathing (2) surrounding the rope core (11) and indicating wear, wherein the sheathing (2) has at least a sheath layer, in which the synthetic fibres having different wear resistance and/or tensile strength and/or bending fatigue are interwoven with each other.

20 Claims, 7 Drawing Sheets

(51) Int. Cl.
  *B66D 1/54* (2006.01)
  *B66B 7/12* (2006.01)
  *D07B 1/04* (2006.01)
  *G01N 21/952* (2006.01)
  *D07B 1/02* (2006.01)
  *B66C 23/16* (2006.01)

(52) U.S. Cl.
  CPC ............... *D07B 1/04* (2013.01); *D07B 1/148* (2013.01); *G01N 21/952* (2013.01); *B66C 23/16* (2013.01); *D07B 1/025* (2013.01); *D07B 2201/209* (2013.01); *D07B 2201/2088* (2013.01); *D07B 2201/2092* (2013.01); *D07B 2501/2015* (2013.01)

(56) References Cited

U.S. PATENT DOCUMENTS

| | | | |
|---|---|---|---|
| 6,321,520 B1 | 11/2001 | De Angelis | |
| 6,341,550 B1* | 1/2002 | White | D07B 1/147 87/5 |
| 7,285,034 B2* | 10/2007 | Kay | A63H 3/52 446/487 |
| 7,329,271 B2* | 2/2008 | Koyfman | A61B 17/06166 606/228 |
| 7,703,372 B1* | 4/2010 | Shakespeare | A63B 29/028 87/6 |
| 8,012,172 B2* | 9/2011 | Grafton | A61B 17/06166 606/228 |
| 8,707,668 B2* | 4/2014 | Gilmore | D07B 1/025 57/210 |
| 9,080,263 B2* | 7/2015 | Egnelov | A61F 2/0063 |
| 2003/0006226 A1 | 1/2003 | Yanagimoto et al. | |
| 2003/0111298 A1 | 6/2003 | Logan et al. | |
| 2005/0226584 A1 | 10/2005 | Williams et al. | |
| 2010/0274282 A1* | 10/2010 | Olson | A61L 17/04 606/228 |
| 2012/0297746 A1* | 11/2012 | Chou | D07B 1/02 57/230 |
| 2013/0145739 A1* | 6/2013 | Smeets | F16G 11/042 57/212 |
| 2013/0205742 A1* | 8/2013 | Smeets | D07B 1/0686 57/212 |
| 2014/0157973 A1* | 6/2014 | Plante | D04C 1/12 87/8 |
| 2015/0176161 A1* | 6/2015 | Chiu | D07B 1/145 139/387 R |
| 2017/0239383 A1* | 8/2017 | Koyfman | A61B 17/0401 |
| 2017/0328001 A1* | 11/2017 | Kirth | D07B 1/025 |
| 2018/0305865 A1* | 10/2018 | Baldinger | D07B 1/02 |

FOREIGN PATENT DOCUMENTS

| | | |
|---|---|---|
| DE | 20 2009 014 031 U1 | 1/2010 |
| DE | 20 2013 101 326 U1 | 6/2013 |
| EP | 0 731 209 A1 | 9/1996 |
| EP | 1 010 803 A2 | 6/2006 |
| EP | 1 930 496 A2 | 6/2008 |
| EP | 1 930 497 A2 | 6/2008 |
| EP | 2 002 051 B1 | 11/2014 |
| JP | H10-318741 A | 12/1998 |
| JP | 2001/192183 A | 7/2001 |
| WO | 2003/054290 A1 | 7/2003 |
| WO | 2004/029343 A1 | 4/2004 |
| WO | 2015/139842 A1 | 9/2015 |

OTHER PUBLICATIONS

Written Opinion dated Jan. 1, 2017, issued in PCT Application No. PCT/EP2016/075251, filed Oct. 20, 2016.

* cited by examiner

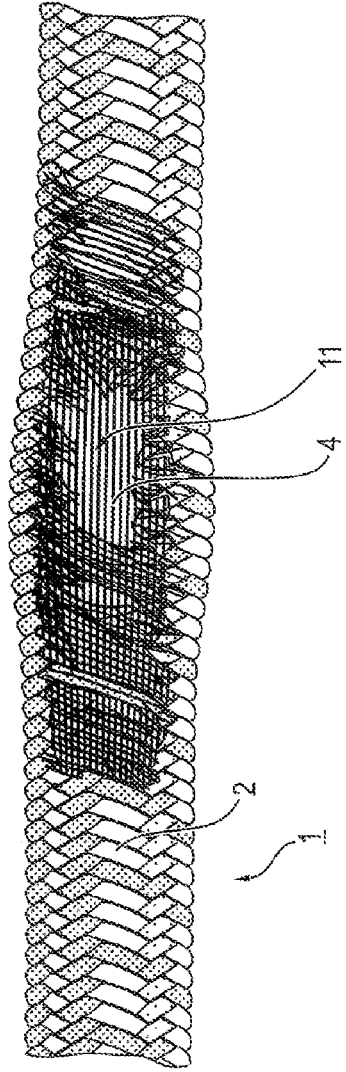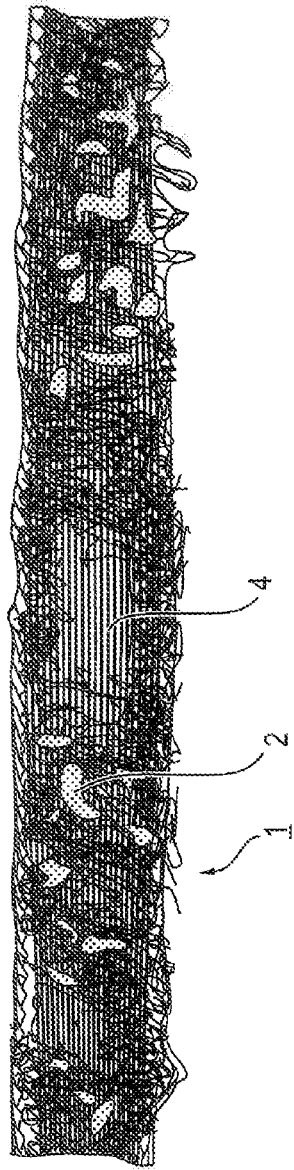

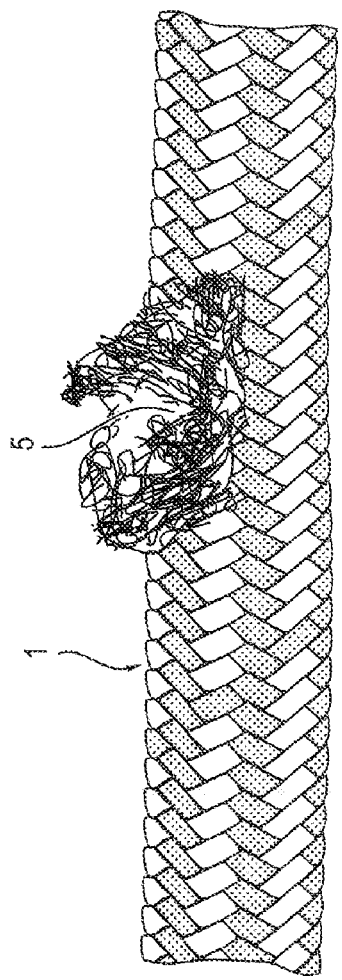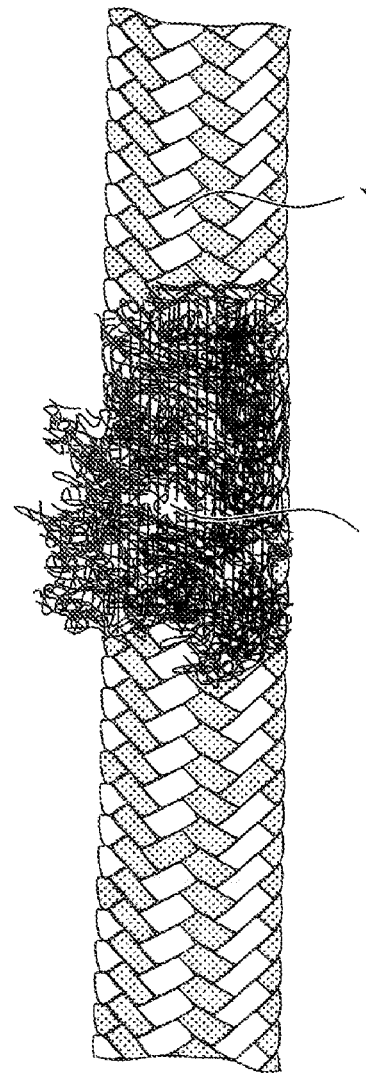

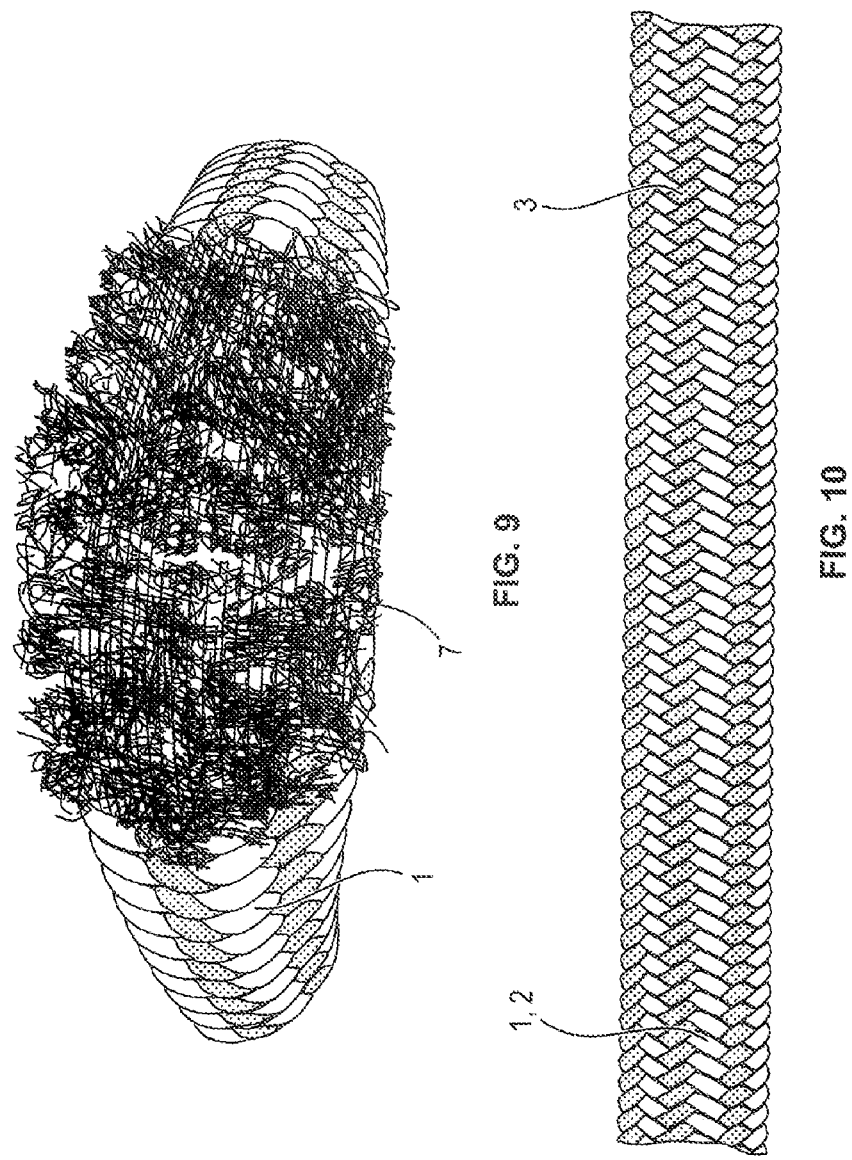

HIGH-STRENGTH FIBER ROPE FOR LIFTING DEVICES SUCH AS CRANES

BACKGROUND

The present invention relates to a high-strength fibre rope for hoisting equipment such as cranes, comprising a rope core comprising high-strength synthetic fibres, as well as a sheathing surrounding the rope core and indicating wear.

For quite some time, attempts have been made in hoisting technology and in particular with cranes to replace the conventional heavy steel ropes with high-strength fibre ropes which are made of high-strength synthetic fibres such as, e.g., aramid fibres (HMPA), aramid/carbon fibre mixtures, high modulus polyethylene fibres (HMPE), or poly (p-phenylene-2,6-benzobisoxazole) fibres (PBO) or at least comprise such fibres. Due to the weight reduction in comparison to steel ropes of up to 80%, with the breaking strength being approximately the same, the load capacity or, respectively, the permissible lifting capacity can be increased, since the dead weight of the rope to be taken into account for the load capacity is significantly smaller. Especially for cranes with high lift heights or in booms or tower shifting equipment with pulleys of a high reeving number, substantial rope lengths and hence also a corresponding rope weight are created so that the decrease in weight, which is feasible because of high-strength fibre ropes, is very advantageous. In addition to the weight advantage of the fibre rope itself, the use of fibre ropes also allows a weight reduction in further components. For example, the load hook can be of a lighter design, since a lower load hook weight is sufficient for the rope tensioning of a fibre rope. On the other hand, the good flexibility of synthetic fibre ropes allows smaller bending radii and hence smaller rope sheaves or, respectively, rolls on the crane, resulting in a further weight reduction especially in the area of the crane boom so that, in case of large crane outreaches, a substantial increase in load torque can be achieved.

In addition to the above-mentioned weight advantages, rope drives with synthetic fibre ropes can be characterized by a substantially longer service life, easy handling and good flexibility as well as the omission of the rope lubrication as required for steel ropes. On the whole, an improved device availability can be achieved in this way.

With such high-strength fibre ropes, however, it is difficult to predict or determine, respectively, in a precise and reliable manner the replacement state of wear thereof. Like steel ropes, high-strength fibre ropes are wear parts, which have to be replaced when their condition has deteriorated to such an extent that the required safety is no longer provided during further operation. This condition is commonly referred to as replacement state of wear.

In conventional steel ropes, the replacement state of wear can, as such, be determined quite easily by inspecting the condition of the rope, with the course of action during the inspection and the scope of testing being specified in ISO Standard 4309. In the process, the focus is basically on the number of wire fractures across a certain measuring length of the rope, a reduction in the rope diameter as well as strand fractures. However, said measuring method is not feasible for detecting the replacement state of wear in high-strength fibre ropes, as the employed synthetic fibres do not exhibit the same behaviour as steel wire strands. In particular in high-strength fibre ropes, a sudden failure or, respectively, an onset of a replacement state of wear without any pre-existing damage that might be recognized gradually, often occurs, since, unlike in steel ropes, frequently individual fibres do not break and fan out gradually, but several fibre strands often fail simultaneously.

From document DE 20 2009 014 031 U1 (DE '031), entitled "Synthetic rope as a carrier for cranes and other hoists", a high strength fibre rope made of synthetic fibres is known, wherein a rope core is provided with a sheathing which is coloured differently than the rope core and itself has, in turn, different sheath layers in different colours. Thanks to this multi-coloured dyeing, it should be identifiable with greater ease when a differently coloured underlying layer or even the rope core appears due to abrasion of an outer layer. However, in practice, this colour indicator function, which, per se, is reasonable, suffers from the fact that, due to the characteristics of high-strength synthetic fibres, the sheathing tends to fail altogether rather suddenly so that it is again difficult to be able to predetermine the replacement state of wear of the rope reliably and in due time. DE '031 teaches that the high-strength synthetic fibre rope is configured for lifting loads using a crane or other hoisting equipment and should have a maximum diameter of 80 mm, preferably a diameter of 10 mm to 60 mm.

EP 1 930 497 A and EP 1 930 496 A disclose the use of an electrically conductive indicator fibre which exhibits a lower resistance to abrasion than the load-bearing strands or fibres of the rope. If the indicator fibre is damaged or breaks, this can be determined by means of conductivity measurements.

This approach is disadvantageous as it requires additional conductivity measurements and, associated therewith, the necessary technical infrastructure such as power source, conductivity meter, connection points for the indicator fibre.

Likewise, methods are known which use the elongation of the rope throughout the service life as an evaluation criterion for the condition of the rope as well as the prediction of the replacement state of wear and determine such in various ways, for example, from EP 2 002 051 A. In the latter document, marks are provided on the sheath of a core/sheath rope (e.g., braided *rhombi* of a differently coloured material), by means of which elongations or twists of the rope can be detected.

From DE 20 2013 101 326 U1, the use of an electrically conductive sensor thread is known.

WO 2003/054290 A1 proposes a ferromagnetic material by means of which local damage to the rope is supposed to be detectable as well.

Further prior art has been known from US 2003/111298, the JP 2001/192183, WO 2004/029343, US 2005/226584, EP 1 905 892, WO 2015/139842, EP 1 530 040, US 2003/062225, US 2003/062226, JP H10318741, EP 1 010 803, EP 0 731 209, DE 22 22 312 A and U.S. Pat. No. 6,321,520 B1.

The use of fibres with varying elongation behaviours within one rope is described in DE 24 55 273 B2 and is supposed to serve the purpose that all strand layers of the rope will assume load, but not the purpose of indicating wear.

It is further worth mentioning that in this disclosure, in stark contrast to the present invention, there are disposed fibres having lower strength inside the rope.

BRIEF SUMMARY

In contrast, the present invention is based on the object of providing an improved high-strength fibre rope, which avoids the disadvantages of the prior art and develops further the latter in an advantageous manner. In particular, a simple, but nonetheless reliable and precise determination of the replacement state of wear and hence a period of use as long as possible should be rendered possible, without thereby compromising the safety of the fibre rope.

Said object is solved by a high-strength fibre rope according to claim 1 as well as a hoisting equipment having such a high-strength fibre rope according to claim 10. Preferred embodiments of the invention are subject of the dependent claims.

Correspondingly, there is proposed to configure the sheathing of the rope core such that damage to the sheathing will not occur simultaneously everywhere but rather partially as well as gradually, by way of which gradually different damage stages and wear conditions may be determined. The sheathing has a fibre structure of different synthetic fibres, which have different wear resistance and, hence, will not all be damaged simultaneously even in the case of an even application of wear-promoting influences but will rather wear gradually. According to the invention, the sheathing has at least one sheath layer, wherein synthetic fibres having different wear resistance and/or tensile strength and/or bending fatigue are interwoven with each other, and optionally several sheath layers, which differ from one another in regard to their fibre structure and the wear resistance and/or tensile strength and/or bending fatigue of the synthetic fibres used in the sheath layers.

The invention thus provides at least one sheath layer having synthetic fibres with different wear properties. Other variants of the invention will, in addition, provide for several sheath layers, which each have fibres having different wear properties or fibres having different wear properties within the respective sheath layers. The sheath layer, which contains fibres having different wear properties, is preferably disposed in the outermost area of the sheathing, especially preferably in the outermost layer of the rope.

The different wear resistances and/or tensile strengths and/or bending fatigue of the synthetic fibres used in the at least one sheath layer will ensure that damage of the sheath layer will only occur partially and gradually such that, by way of the gradually increasing damage locations, it will be possible to gradually determine and quantify different wear conditions of the rope and the remaining interval to the replacement state of wear associated therewith. The determination of the extent of damage will thereby be realized in particular by optical inspection. For this reason, the fibres having different wear resistance and/or tensile strength and/ or bending fatigue are especially preferably present in the outer or outermost, respectively, areas of the sheathing and are visible from the outside and optically accessible. Likewise, the sheath is essentially configured as being non-load-bearing.

Advantageously, the synthetic fibres interweaved with one another in the at least one sheath layer may be made of different materials. For example, there may be interwoven HMPE fibres and polyester fibres in a sheath layer. Alternatively or additionally, there may also be interwoven with each other or woven into the sheath layer mentioned above, respectively, also other fibres of those initially mentioned such as PBO fibres and/or aramid-carbon-mixture fibres.

If there are provided several sheath layers, these may differ from one another in regard to their fibre structure, e.g., of different synthetic fibres, and in regard to the wear resistance and/or tensile strength and/or bending fatigue of the synthetic fibres used in or within, respectively, the sheath layers.

There may, for example, be provided in a first outer sheath layer different synthetic fibres, which differ from one another in regard to their resistance to wear, bending fatigue and/or tensile strength from any other synthetic fibres in a second underlying sheath layer. Advantageously, there may also be provided synthetic fibres having a certain wear resistance and/or tensile strength in every sheath layer, which are not provided in any other sheath layer, such that every sheath layer has a characteristic resistance to wear and break damage, which will lead to a partially different damage pattern in every sheath layer. Upon failure of the outermost sheath, this will make it easy to distinguish between damage patterns at different depths in a simple way.

The synthetic fibres used in the different sheath layers may also be made of different materials, for example in a way such that there are provided in a first sheath layer synthetic fibres of a material, which are not present in a second sheath layer.

Alternatively or additionally to the fibres that differ from layer to layer, the sheath layers of the sheathing may also have different layer thicknesses and/or there may be provided synthetic fibres and/or strands having thicknesses that are different from layer to layer. By using synthetic fibres having different thicknesses, there may be obtained damage patterns that are different from layer to layer. Likewise, by using different layer thicknesses, which may increase from the outside to the inside, there may be ensured that it will be difficult for gradually deeper damage patterns to develop and that initially only slight damage patterns, which are relative far away from the replacement state of wear, will develop on the outer layer, thus being easily recognizable.

If there are provided several sheath layers, there will be present fibres having different wear resistance and/or tensile strength and/or bending fatigue in the outermost sheath layer.

Using synthetic fibres having different fibre thickness and/or different strand thickness may be reasonable also in a sheath layer in order to obtain partially different damage patterns in a sheath layer.

In order for the different damage patterns also being easily recognizable in the case of only a small extent of damage, the synthetic fibres, which have different resistance to wear, bending fatigue and/or tensile strength and/or which may be composed of different materials, may be coloured in different colours. Alternatively or additionally, there may be used colours that are different from sheath layer to sheath layer, or different sheath layers may be differently coloured, respectively. In this way, it is made easier to optically determine a damage of the sheathing, as in the case of wear of an outer sheath layer the underlying sheath layer will become visible in a different colour or colour combination.

In particular also the rope core may have a colour different to that of the sheathing, in particular also a colour different to that of the lowermost or innermost, respectively, sheath layer of the sheathing, such that at the latest upon complete wear of the sheathing the different colour of the rope core will be become visible.

Determining the replacement state of wear may be performed by way of reference depictions of the rope at different levels of damage by a person skilled in the art such as, e.g., crane operator, as a visual inspection, who may categorize, determine in writing and sum up the damage patterns occurred in order to optionally determine the replacement state of wear or call for an expert.

BRIEF DESCRIPTION OF THE DRAWINGS

The invention is explained in greater detail by way of a preferred embodiment example and related drawings. The drawings show:

FIG. 1 to FIG. 5: each show a side view of a high-strength fibre rope having a woven sheathing, wherein the sheath wear occurring in the sheathing is depicted showing different damage levels and wherein the rope core gradually surfaces, FIG. 6 to FIG. 9: each show a top view of a portion of a high-strength fibre rope having a sheathing according to a further embodiment of the invention, wherein herein cuts into the rope are depicted as damage of the sheathing in different development stages, FIG. 10 to FIG. 13: each show a top view of a portion of a high-strength fibre rope having a sheathing according to a further embodiment of the invention, wherein herein damage of the sheathing is depicted in the form of a pinch/local thickening of the rope in different development stages.

DETAILED DESCRIPTION

Figure 5:
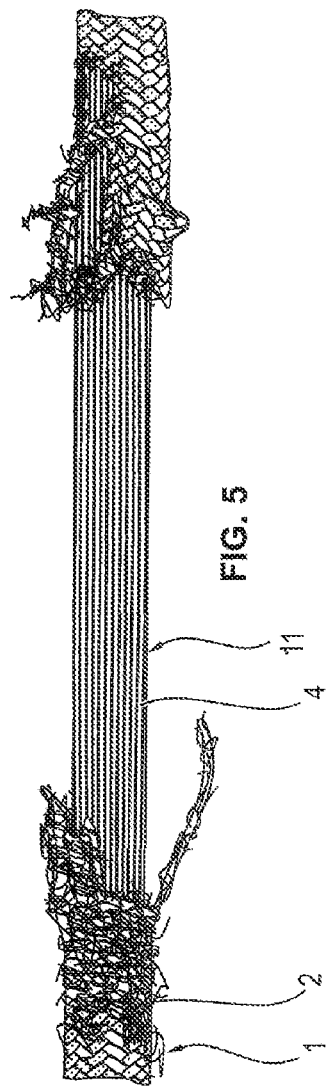

As, for example, shown by the FIGS. 4 and 5, the high-strength fibre rope comprises a rope core 11, which may be woven or made from strands 4, which in turn are made from high-strength synthetic fibres or at least comprise such high-strength synthetic fibres, for example HPMA fibres, HMPE fibres or others of the fibre types initially mentioned, wherein said rope core 11 may be composed of fibres of one fibre type or fibres of different fibre types.

The sheathing 2 surrounds said rope core 11 and may rest directly on said rope core, or it may optionally be spaced apart therefrom by an intermediate layer. Said sheathing 2 may form in particular the outer sheath of the rope 1. The rope core 11 may take over the entire tensile strength of the rope 1. The sheathing 2 furthermore only has a supportive effect, in particular as a protection for the rope core 11 and as a wear indicator.

Figure 14:
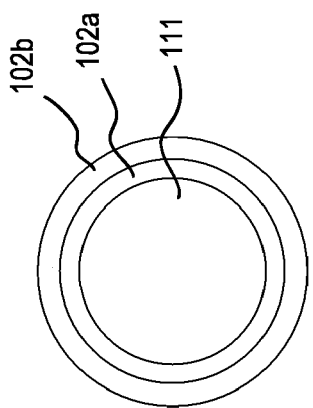
FIG. 14: shows a cross section of a high-strength fibre rope having a plurality of sheath layers.

Said sheathing 2 may thereby be composed of a single sheath layer, or it may also comprise several sheath layers, which are arranged one on top of the other. FIG. 14, for example, shows a cross-sectional view of a high-strength fibre rope having a rope core 111 and multiple sheath layers 102a and 102b.

As shown by the figures, said sheathing 2 comprises strands 3, which are interwoven with each other into the sheathing 2 and which each may be composed of high-strength synthetic fibres or may at least have such high-strength synthetic fibres.

In particular, said strands 3 of the sheathing 2 may be formed, in the way initially described in greater detail, from different synthetic fibres having different wear resistance and/or tensile strength and/or different materials. As shown in the figures, said strands 3 are preferably coloured in different colours.

In the FIGS. 1 to 5 there is depicted a sheath wear of the sheathing 2, which may be conditioned, for example, by the rope drive, in particular the deflection of the rope about the rope roll, the bending fatigue in the rope course, the rope friction on the drum while spooling and also stress due to multi-layered winding onto the drum, wherein the rope portions of an upper layer threaten to cut in-between the rope portions of a lower layer.

Figure 1:
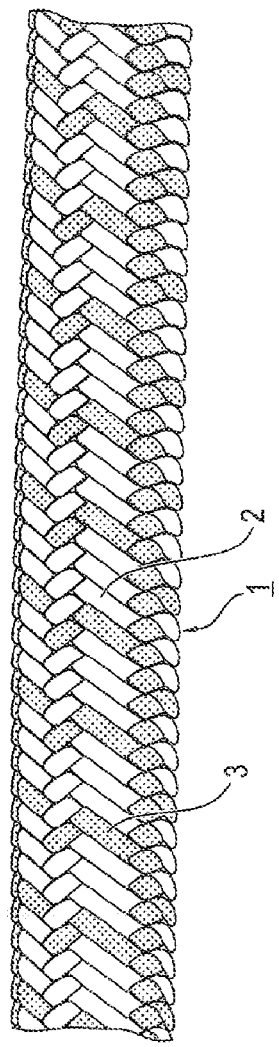

FIG. 1 shows the rope 1 with the sheathing 2 and the strands 3 of the sheathing in different colours. Extent of the damage shown about 5% of the replacement state of wear.

Figure 2:
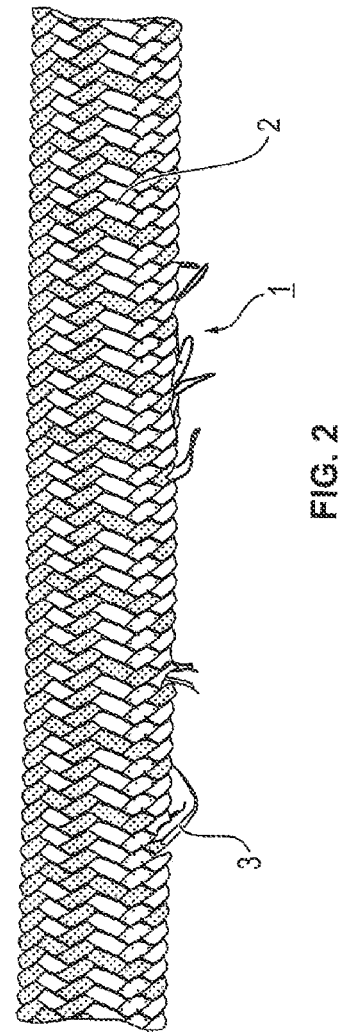

FIG. 2 shows the rope 1 with the sheathing 2, however with a visible wear of the individual strands 3 of the sheathing. Extent of the damage shown about 25% of the replacement state of wear.

FIG. 3 shows the rope 1, the sheathing of which has been worn over a partial portion of about 90% and wherein the strands 4 of the bearing rope core become visible. Extent of the damage shown about 50% of the replacement state of wear.

FIG. 4 shows the rope 1, the sheathing of which has a progressing wear condition in a partial portion of about 180° and wherein the strands 4 of the bearing rope core are well visible in this partial portion. Extent of the damage shown about 75% of the replacement state of wear.

FIG. 5 shows the rope 1, the sheathing of which has a progressing wear condition over the entire rope range (360°). The sheathing is worn and displaced, and the strands 4 of the bearing rope are completely visible in this partial portion. Extent of the damage shown about 100% of the replacement state of wear.

The FIGS. 6 to 9 show a damage of the rope in the form of cuts, which lead to a gradually spreading damage extent.

Figure 6:
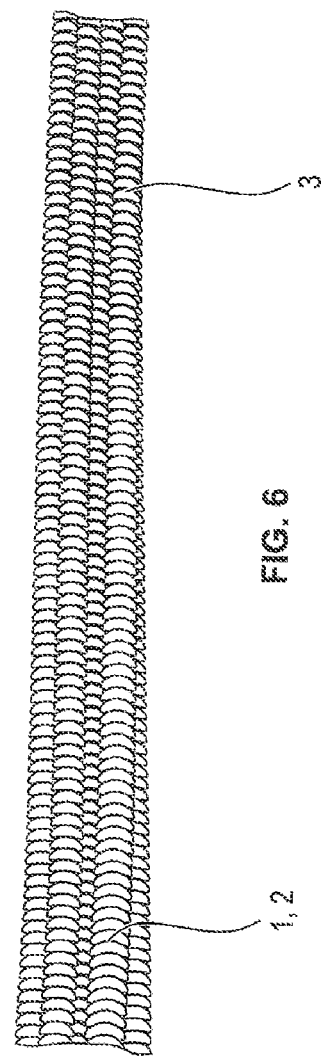

FIG. 6 shows the rope 1 with sheathing 2 and the strands 3 of the sheathing in different colours. Extent of the damage shown about 0% of the replacement state of wear.

FIG. 7 shows the rope 1, the sheathing of which has a visibly tiny cut 5. Extent of the damage shown about 25% of the replacement state of wear.

FIG. 8 shows the rope 1, the sheathing of which and a strand of the bearing rope have a visible cut 6. Extent of the damage shown about 50% of the replacement state of wear.

FIG. 9 shows the rope 1, the sheathing of which and at least one strand of the bearing rope have a visible cut-through 7. Extent of the damage shown about 100% of the replacement state of wear.

The FIGS. 10 to 13 finally show damage of the high-strength fibre rope in the form of pinches of the rope.

FIG. 10 shows the rope 1 with the sheathing 2 and the strands 3 of the sheathing in different colours. Extent of the damage shown about 0% of the replacement state of wear.

Figure 11:
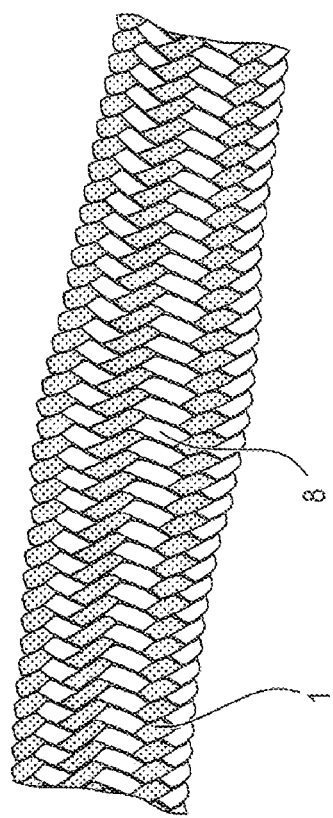

FIG. 11 shows the rope 1 with a small pitch 8 and ovalization of the cross-section of the rope. Extent of the damage shown about 25% of the replacement state of wear.

Figure 12:
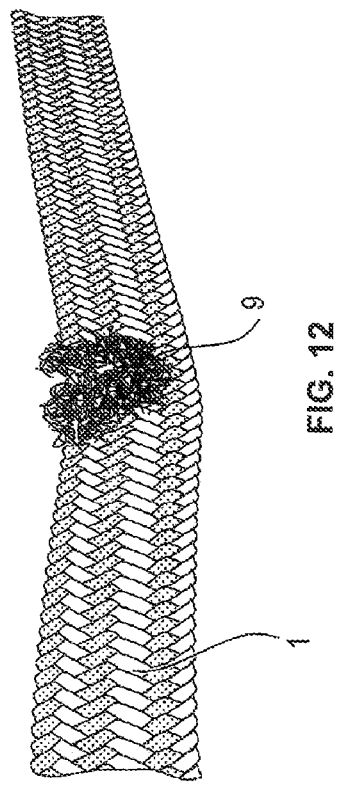

FIG. 12 shows the rope 1 with a large pitch 9 and a strong ovalization of the cross-section of the rope. Extent of the damage shown about 50% of the replacement state of wear.

Figure 13:
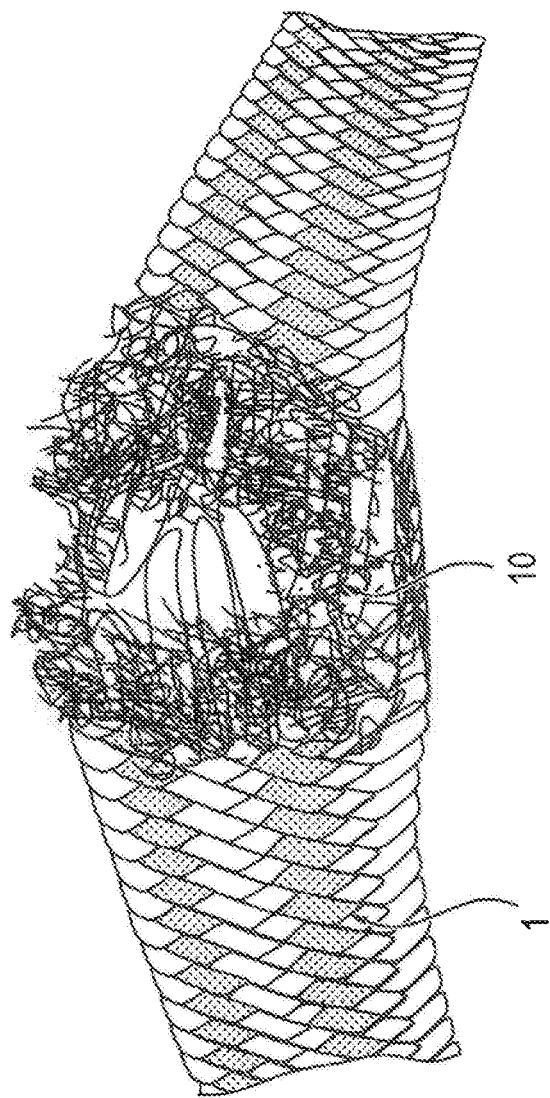

FIG. 13 shows the rope 1 with such a strong pitch 10 such that the sheathing is opened and the damaged strands of the bearing rope core surface. Extent of the damage shown about 100% of the replacement state of wear.

The invention claimed is:

1. A high-strength fibre rope for hoisting equipment, comprising:
  a rope core comprising high-strength synthetic fibres or strands; and
  a sheathing surrounding the rope core and indicating wear,
  wherein the high-strength fibre rope has a diameter of 10 mm to 80 mm so as to be configured for use with hoisting equipment,
  wherein the sheathing has a first sheath layer, the first sheath layer comprising at least a first strand and a second strand, wherein the first strand is formed from first synthetic fibres and the second strand is formed from second synthetic fibres, wherein the first synthetic fibres and the second synthetic fibres have one or more of different wear resistance, different tensile strength, or different bending fatigue, wherein the first strand and the second strand are interwoven with each other, and wherein the sheathing is configured such that an extent of damage of the first sheath layer can be optically inspected by virtue of the synthetic fibres having one or more of different wear resistance, different tensile strength, or different bending fatigue.

2. A high-strength fibre rope according to claim 1, wherein the synthetic fibres in said first sheath layer are comprised of various fibre materials.

3. A high-strength fibre rope according to claim 2, wherein the synthetic fibres comprise HMPE fibres and polyester fibres.

4. A high-strength fibre rope according to claim 1, wherein the first sheath layer containing fibres having various wear properties is disposed in an outermost area of the sheathing.

5. A high-strength fibre rope according to claim 1, wherein the sheathing has a plurality of sheath layers, which differ from each other in regard to the fibre structure thereof and differ from each other in one or more of wear resistance, tensile strength, or bending fatigue of the synthetic fibres used in the sheath layers, and thereby each provide a different damage pattern.

6. A high-strength fibre rope having a plurality of sheath layers according to claim 5, wherein the synthetic fibres of the first sheath layer each differ from synthetic fibres of a second sheath layer according to one or more of wear resistance, tensile strength, bending fatigue, or the material thereof.

7. A high-strength fibre rope according to claim 1, wherein the sheathing has a plurality of sheath layers, each differing by one or more of layer thickness, types of synthetic fibres, or strand thickness.

8. A high-strength fibre rope according to claim 1, wherein the synthetic fibres, which exhibit one or more of different wear resistance, different tensile strength, or that are composed of different materials are dyed in different colours.

9. A high-strength fibre rope according to claim 1, wherein the rope core has a colour deviating from that of the sheathing.

10. A high-strength fibre rope according to claim 1, wherein the sheathing of the rope core forms the outer sheath of the rope.

11. Hoisting equipment comprising a high-strength fibre rope configured according to claim 1.

12. The hoisting equipment according to claim 11, wherein the high-strength fibre rope forms a crane hoist rope or a crane boom suspension rope.

13. The hoisting equipment of claim 11, wherein the hoisting equipment is a crane.

14. The hoisting equipment of claim 11, wherein the hoisting equipment is a tower slewing crane.

15. The hoisting equipment of claim 11, wherein the hoisting equipment is a telescopic crane.

16. The hoisting equipment of claim 11, wherein the hoisting equipment is a dockside crane.

17. The hoisting equipment of claim 11, wherein the hoisting equipment is a ship crane.

18. Hoisting equipment comprising a high-strength fibre rope, wherein the high-strength fibre rope comprises:

a rope core comprising high-strength synthetic fibres or strands; and a sheathing surrounding the rope core and indicating wear, wherein the sheathing has a first sheath layer, the first sheath layer comprising at least a first strand and a second strand, wherein the first strand is formed from first synthetic fibres and the second strand is formed from second synthetic fibres, wherein the first synthetic fibres and the second synthetic fibres have one or more of different wear resistance, different tensile strength, or different bending fatigue, wherein the first strand and the second strand are interwoven with each other, and wherein the high-strength fibre rope is configured for lifting loads by the hoisting equipment.

19. A high-strength fibre rope for hoisting equipment, comprising:

a rope core comprising high-strength synthetic fibres or strands; and a sheathing surrounding the rope core and indicating wear, wherein the high-strength fibre rope has a diameter of 10 mm to 80 mm so as to be configured for use with hoisting equipment, wherein the sheathing has a first sheath layer, in which synthetic fibres having one or more of different wear resistance, different tensile strength, or different bending fatigue are interwoven with each other, wherein the sheathing is configured such that an extent of damage of the first sheath layer can be optically inspected by virtue of the synthetic fibres having one or more of different wear resistance, different tensile strength, or different bending fatigue, wherein the sheathing has a plurality of sheath layers, which differ from each other in regard to the fibre structure thereof and differ from each other in one or more of wear resistance, tensile strength, or bending fatigue of the synthetic fibres used in the sheath layers, and thereby each provide a different damage pattern.

20. A high-strength fibre rope for hoisting equipment, comprising:

a rope core comprising high-strength synthetic fibres or strands; and a sheathing surrounding the rope core and indicating wear, wherein the high-strength fibre rope has a diameter of 10 mm to 80 mm so as to be configured for use with hoisting equipment, wherein the sheathing has a first sheath layer, in which synthetic fibres having one or more of different wear resistance, different tensile strength, or different bending fatigue are interwoven with each other, wherein the sheathing is configured such that an extent of damage of the first sheath layer can be optically inspected by virtue of the synthetic fibres having one or more of different wear resistance, different tensile strength, or different bending fatigue, wherein the sheathing has a plurality of sheath layers, each differing by one or more of layer thickness, types of synthetic fibres, or strand thickness.

* * * * *